United States Patent [19]

Neill

[11] Patent Number: 5,535,929
[45] Date of Patent: Jul. 16, 1996

[54] TIP-OFF BAGGAGE CARRIER APPARATUS

[76] Inventor: James M. Neill, 413 Hill Rd., Perkasie, Pa. 18944

[21] Appl. No.: 274,231

[22] Filed: Jul. 13, 1994

[51] Int. Cl.$^6$ .................................................. B60R 9/042
[52] U.S. Cl. ........................ 224/310; 224/328; 414/462
[58] Field of Search ................................... 224/328, 917, 224/309, 310, 315–317, 319, 322–324, 328–330, 42.38, 42.32 R, 42.41, 42.54 R, 404, 405; 220/210, 315, 625; 206/315.1, 315.11; 414/461, 462

[56] References Cited

U.S. PATENT DOCUMENTS

| D. 294,137 | 2/1988 | Robson | D12/157 |
|---|---|---|---|
| 2,506,421 | 5/1950 | Hacker et al. | 414/462 |
| 3,112,041 | 11/1963 | Havens | 224/310 |
| 3,452,893 | 7/1969 | Heflin | 224/329 |
| 3,963,136 | 6/1976 | Spanke | 224/310 |
| 4,065,041 | 12/1977 | Stegavig et al. | 224/42.1 |
| 4,291,823 | 9/1981 | Freeman et al. | 224/310 |
| 4,635,992 | 1/1987 | Hamilton et al. | 224/404 |
| 4,641,769 | 2/1987 | Ten Angel | 224/314 |
| 4,682,719 | 7/1987 | Ernst et al. | 224/310 |
| 4,984,726 | 1/1991 | Marshall | 224/331 |
| 5,069,377 | 12/1991 | Baughman | 224/326 |

FOREIGN PATENT DOCUMENTS 2596344  10/1987  France ................................. 224/310

OTHER PUBLICATIONS

"Any Load • Any Road Yakima Catalog, 1993", pp. 1, 2, 4, 5, 36, and 40; Yakima, P.O. Box 4899, Arcata, CA 95521 USA.

*Primary Examiner*—Henry J. Recla
*Assistant Examiner*—Gregory M. Vidwich
*Attorney, Agent, or Firm*—Joseph W. Molasky & Associates

[57] ABSTRACT

A tip-off baggage carrier attachable to the top of a vehicle is comprised of a storage shell attached by struts and wheels to a track. The baggage carrier provides a shell which can be moved from a carrier position atop the vehicle, to a loading position adjacent a vehicle, and to a position completely removed from a vehicle, thereby, providing the baggage carrier user convenient access to the storage shell.

4 Claims, 5 Drawing Sheets

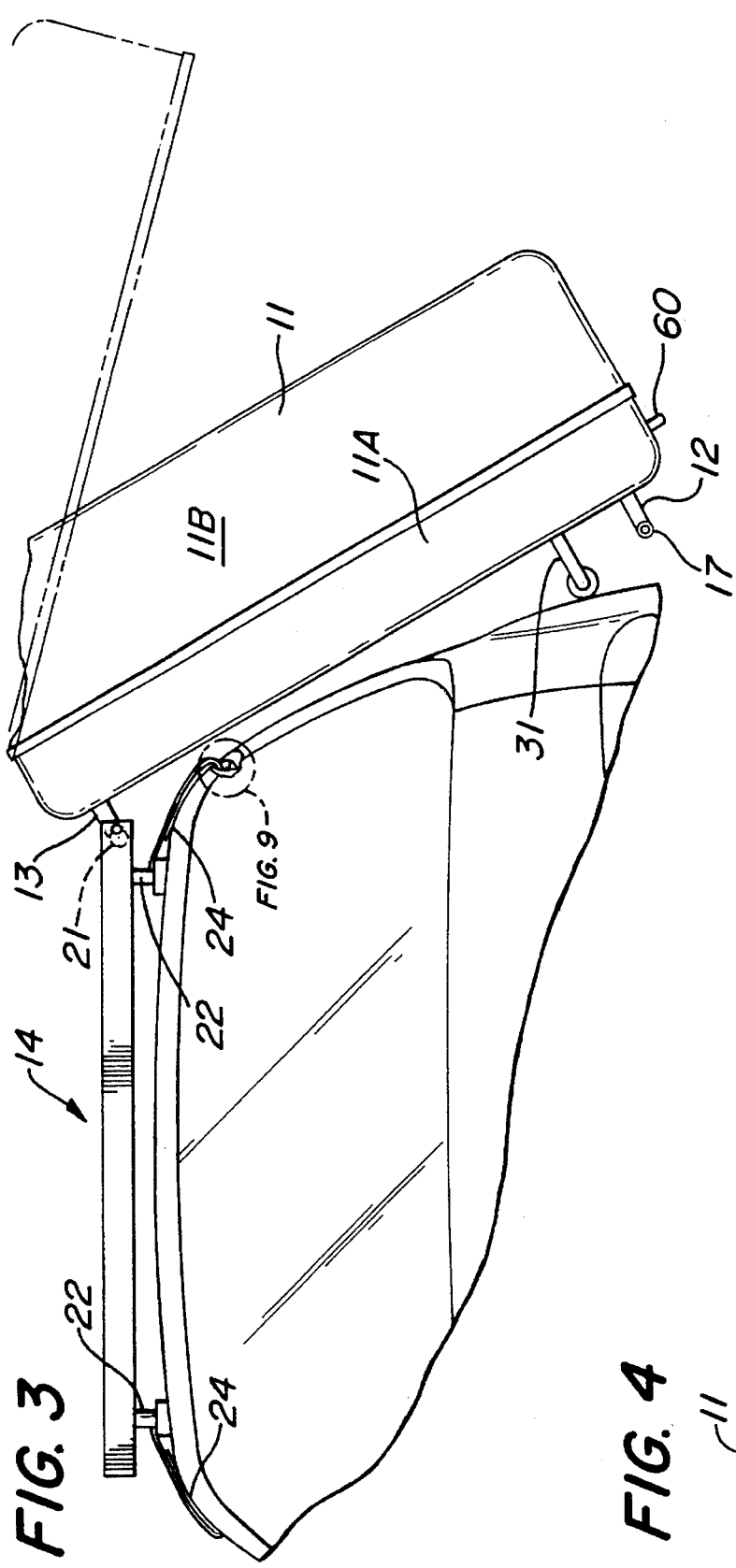

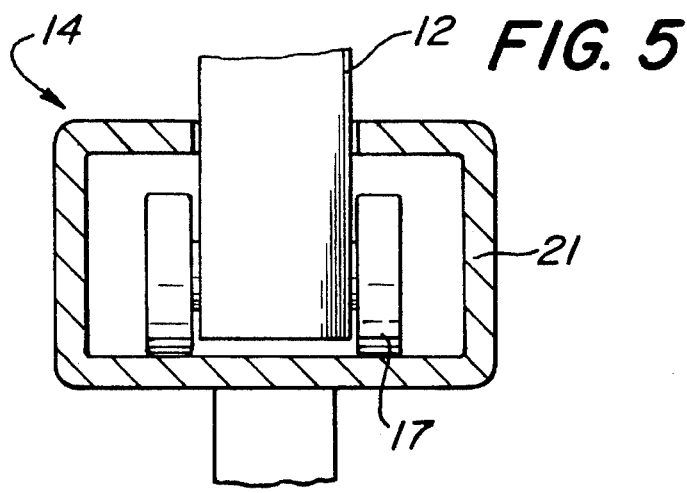
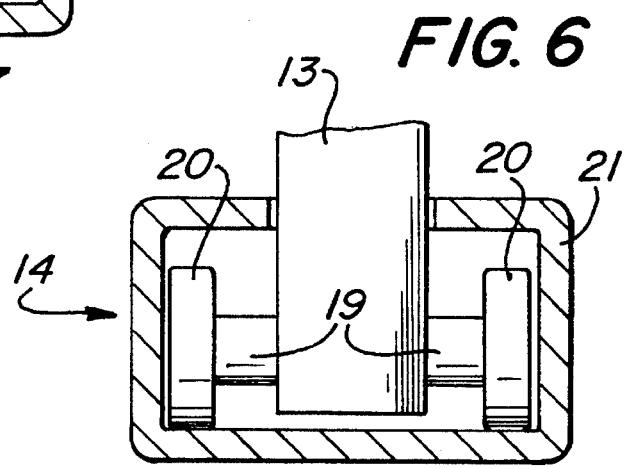
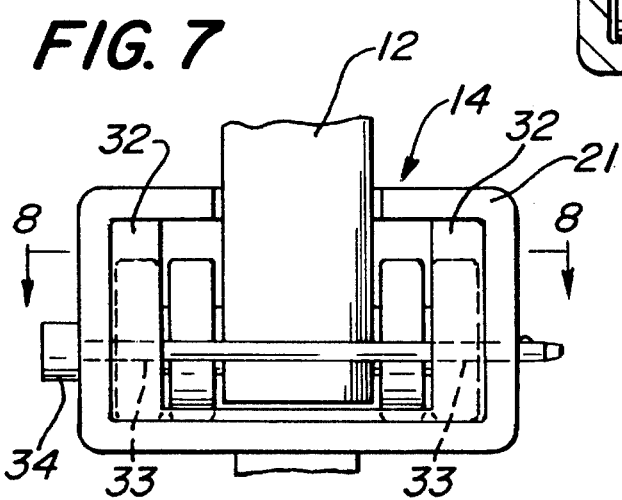
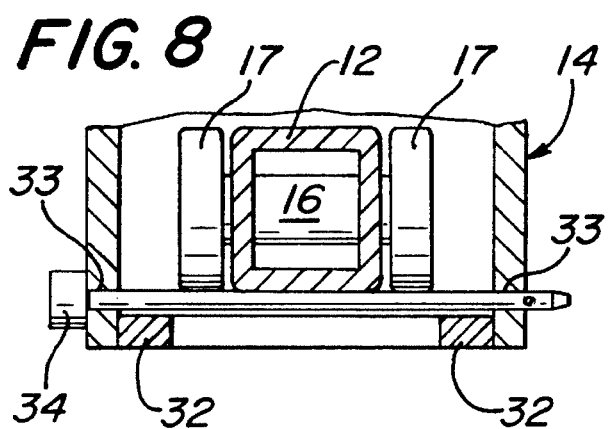
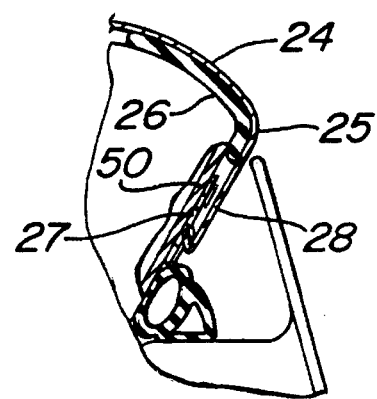

TIP-OFF BAGGAGE CARRIER APPARATUS

BACKGROUND OF THE INVENTION

This invention relates to vehicle baggage carriers and, more particularly, to a baggage carrier positioned atop a vehicle which can be tipped off of the vehicle top or removed from the vehicle top for ease of access during baggage loading and unloading.

Baggage carriers for mounting atop of vehicles and used to store and transport luggage, skis, camping equipment, and the like are well known. Car top carriers allow bulky objects to be conveniently transported without taking up vehicle trunk or passenger compartment space. However, previous baggage carriers suffer from the disadvantage that, since they are mounted atop a vehicle passenger compartment, they are relatively high off of the ground. This makes most baggage carriers inconvenient to load and unload for adults and inaccessible to children or adults of short height.

A need, therefore, exists for a baggage carrier mountable on top of a vehicle which is positionable to provide easier loading and unloading than was possible with previous carriers and is thereby accessible to most people.

SUMMARY OF THE INVENTION

Accordingly, it is an object of the present invention to provide a novel baggage carrier, mountable on a vehicle top which is movable from a carrier position atop a vehicle to a loading position alongside a vehicle, or to a loading position removed from the vehicle which is accessible to most people.

Briefly, this and other objects and aspects of the invention are accomplished by a tip-off carrier apparatus attachable to the top of a vehicle. The apparatus comprises a storage shell; a plurality of first struts and a plurality of second struts each strut having a wheel assembly and each strut attached to the storage shell; and a plurality of track means in which the wheel assemblies make rolling contact. The first and second wheel assemblies are retainable within and removable from the track means such that the shell is alternatively adjustable from a carrier position secured on a vehicle top to a loading position adjacent the vehicle, offset from the vehicle top, and to a position completely removed from the vehicle.

Another embodiment of this invention comprises a tip-off carrier apparatus attachable to the top of a vehicle. The apparatus comprises a cover means; a telescoping frame attached to the cover means; a plurality of first posts and a plurality of second posts. The first posts are shorter than the second posts, each post is attached to a wheel and each post is attached to the telescoping frame. The apparatus is further comprised of a plurality of track means in which the wheel assemblies make rolling contact. The wheels attached to the first and second posts are retainable within and removable from the track means such that the frame is alternatively movable from a carrier position secured on a vehicle top to a loading position adjacent the vehicle, offset from the vehicle top, and to a position completely removed from the vehicle.

Still another embodiment of this invention comprises a tip-off carrier apparatus attachable to the top of a vehicle. The apparatus comprises a storage shell; a plurality of first struts and a plurality of second struts attached to the storage shell; each said strut having a bearing means; a plurality of track means in which the bearing means of the first and second struts make moving contact, each track means having a removal port and each track means affixed to the top of a vehicle. The bearing means of the first and second struts are removable from the track means via the removal ports such that the shell is alternatively adjustable to a carrier position secured on the vehicle top, to a loading position adjacent the vehicle, offset from the vehicle top, and to a position completely removed from the vehicle.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 3 is a side elevational view of the invention in the loading position.

FIG. 4 is a fragmentary view of shell 11 and a sectional view of track means 14.

FIG. 5 is a section taken in the direction of arrows 5—5 of FIG. 2 on an increased scale.

FIG. 6 is a section taken in the direction of arrows 6—6 of FIG. 2 on an increased scale.

FIG. 7 is a fragmentary side view of track means 14, and pin 34 on an increased scale.

FIG. 8 is a section taken in the direction of arrows 8—8 of FIG. 7.

FIG. 9 is a fragmentary sectional view of flexible mounting member 24 on an increased scale.

DESCRIPTION OF THE PREFERRED EMBODIMENT

Figure 1:
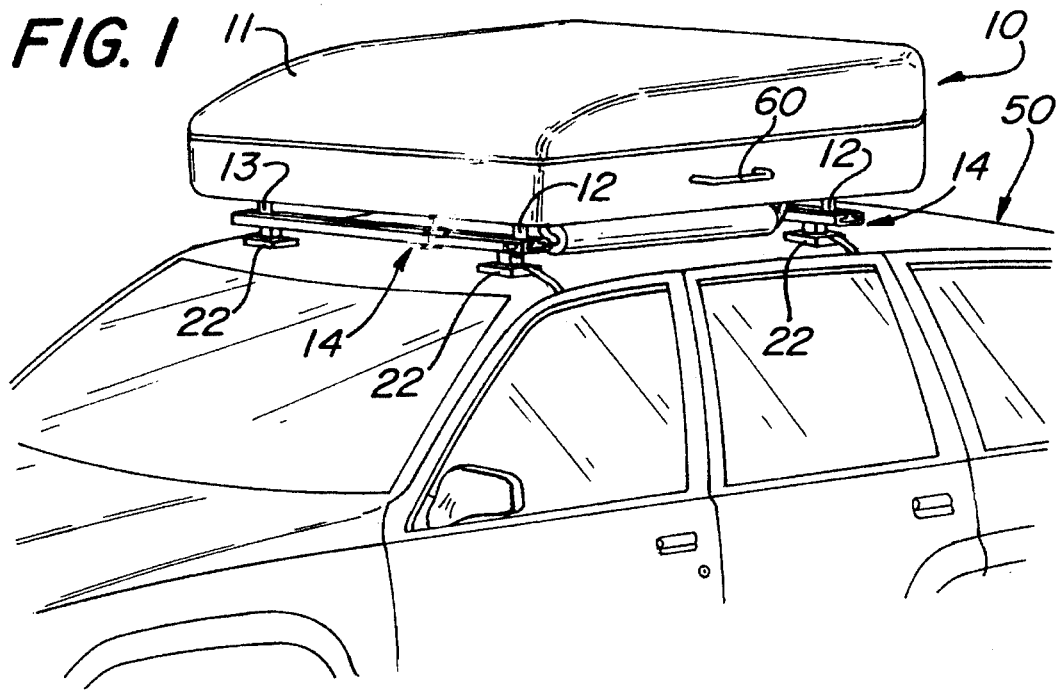
FIG. 1 is a top perspective view of one embodiment of the carrier apparatus of the present invention secured atop a vehicle.
Figure 2:
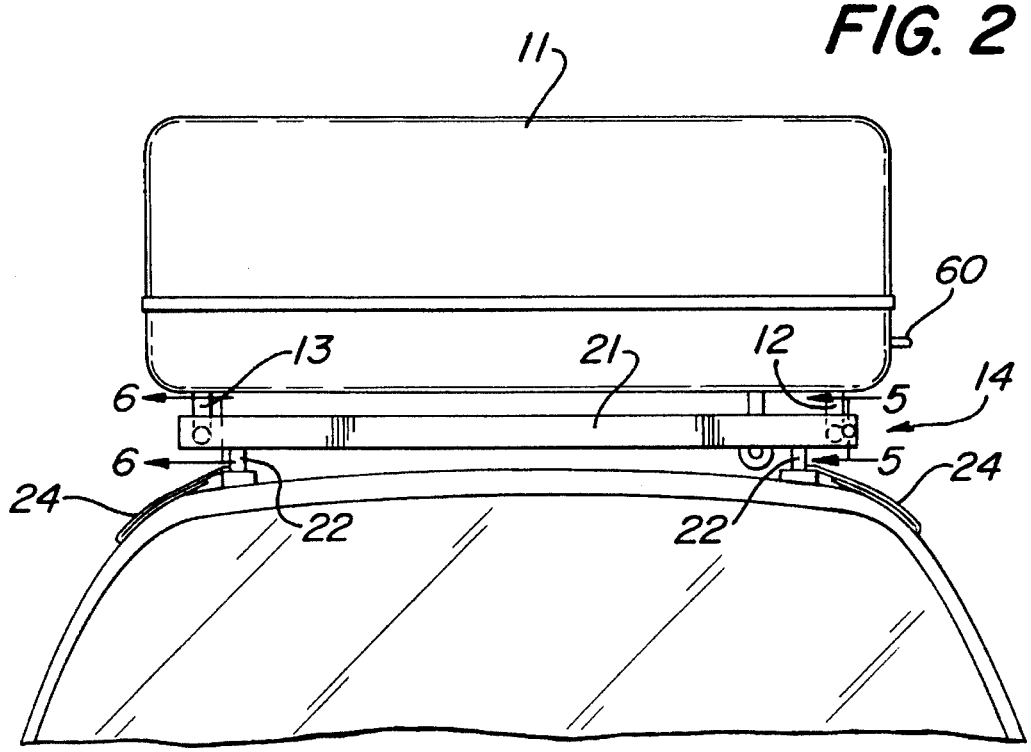
FIG. 2 is a front side elevational view of the carrier apparatus illustrated in FIG. 1.

Referring now to the drawings wherein like characters designate like or corresponding parts throughout the several views, FIG. 1 shows a carrier apparatus, shown generally as 10 atop a vehicle shown generally as 50. Carrier apparatus 10 is comprised of a storage shell 11, a plurality of first struts 12, a plurality of second struts 13 (one of which second struts 13 is shown in FIG. 1 and one is hidden in FIG. 1, however, the hidden second strut is identical to the second strut 13 which is illustrated), and a plurality of track means shown generally as 14. First struts 12 are shown in detail in FIGS. 5, 7, and 8. Each first strut has a wheel assembly which, in this embodiment, is shown as an axle 16 attached to strut 12 and attached to two wheels 17 as shown in FIG. 8. Each second strut 13 has a wheel assembly which, in this embodiment, is shown as an axle 19 attached to strut 13 and attached to two wheels 20 as shown in FIG. 6. Axles 19 attached to second struts 13 are longer than axles 16 attached to first struts 12 as shown in FIG. 7 for reasons explained hereinafter.

Track means 14 is comprised of a plurality of generally C-shaped tubular members 21 in which the wheel assemblies attached to the first and second struts are enclosed as shown in FIGS. 4–8. Each track means 14 has a first end 29, a second end 30, and a second strut wheel removal port 15 shown in FIG. 4. Second end 30 is sealed and contains a bumper 31. First end 29 is partially obstructed by blocks 32 as shown in FIGS. 7 and 8. First end 29 also has a bore 33 through which locking pin 34 is removably disposed as shown in FIGS. 7 and 8. Track means 14 is supported above the roof of vehicle 50 by cushioned support members 22 as shown in FIGS. 1 and 4. Cushion 23 is constructed of polymeric material which prevents track means 14 from marring the paint on vehicle 50.

Flexible mounting members 24 are attached to cushioned support members 22 and are shown generally in FIGS. 3 and 4 and in detail in FIG. 9. Each Flexible mounting member 24 is comprised of a strap 25 having a cushion 26, removably attached to an anchor such as a plate 27 affixed to vehicle 50 by a screw 28.

Carrier apparatus 10 is utilized by removing locking pin 34 shown in FIGS. 7 and 8. Handle 60 on shell 11 is then grasped by the carrier user and wheels 17 attached to first struts 12 are pulled past blocks 32 and out of track means 14. Shell 11 is then pulled away from vehicle 50 until wheels 20 on second struts 13 impact blocks 32. Shell 11 is then allowed to drape over the passenger compartment of vehicle 50 in the loading position as shown in FIG. 3. Bumper 31 attached to shell 11 supports shell 11 above vehicle 50 and prevents shell 11 from marring the paint on vehicle 50. Shell 11 is comprised of a lower portion 11A and a top portion 11B. Top portion 11B is removably attached to bottom portion 11A and can be lifted away from bottom portion 11A as shown in hatched lines in FIG. 3 for convenient loading and unloading of objects within shell 11.

The tip-off capability of shell 11 allows the carrier to be utilized without the aid of chairs, step ladders, and the like or the need for people to climb onto car hoods, trunks, or tailgates to access shell 11 as is commonly needed for carriers which have shells which are limited to a single fixed position on top of a vehicle.

To return shell 11 from the loading position adjacent vehicle 50 to the carrier position atop vehicle 50, the user rejoins shell portions 11A and 11B and grasps handle 60. Shell 11 is then lifted away from vehicle 50 such that wheels 17 are in line with wheels 20 and track means 14. Pressure is then applied by the user on shell 11 until wheels 17 slide between blocks 32 and wheels 20 impact bumpers 31. Pin 34 is then reinserted into bore 33 thereby locking wheels 17 within track means 14 and allowing the user to move vehicle 50 with the apparatus 10 firmly retained by pin 34 in the carrier position. The position of the wheels in relationship to track means 14 while shell 11 is in the carrier position is shown in FIG. 4.

As an alternative to tipping shell 11 off of vehicle 50, shell 11 can be removed completely from track means 14 by removing locking pin 34 from bore 33, pulling wheels 17 past blocks 32, and then lifting wheels 20 attached to struts 13 through second strut removal port 15. Shell 11 can then be accessed for loading or unloading or stored until needed. To reattach shell 11 to track means 14, wheels 20 are inserted into port 15 and slid toward end 30 of track means 14, wheels 17 are inserted past blocks 32, into track means 14, and pin 34 is inserted into bore 33.

Carrier apparatus 10 thus provides a car top baggage carrier, which is simple to operate, can be removed from atop a vehicle as needed and has a tip-off design providing the apparatus user convenient and easy access to shell 11.

Figure 10:
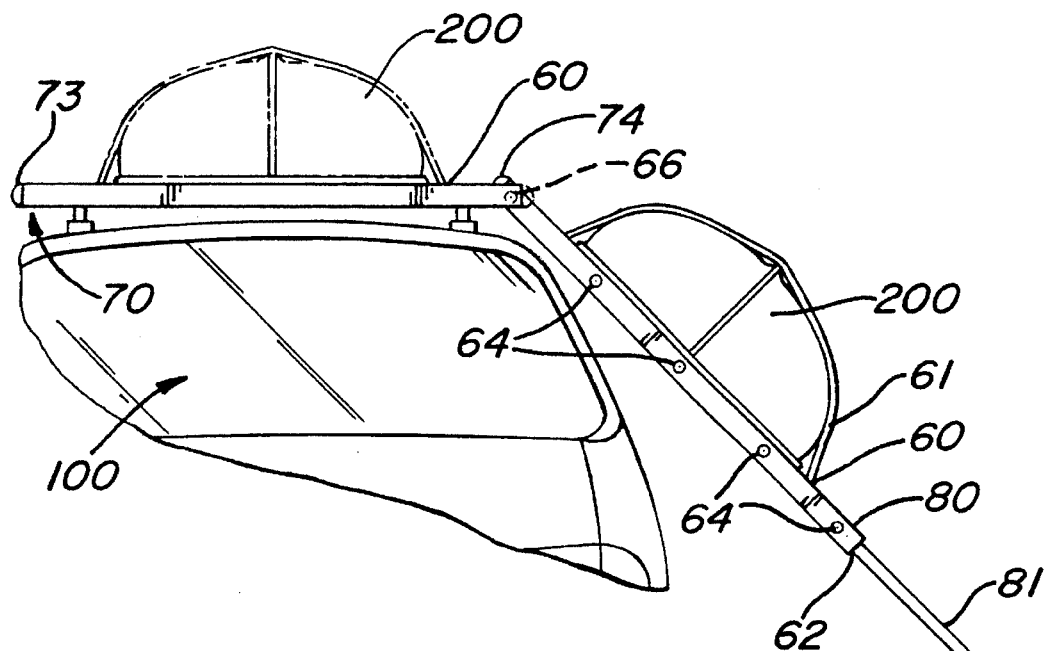
FIG. 10 is a front side elevational view of one embodiment of the carrier apparatus of the present invention secured atop a vehicle illustrating both the carrier and loading positions.
Figure 11:
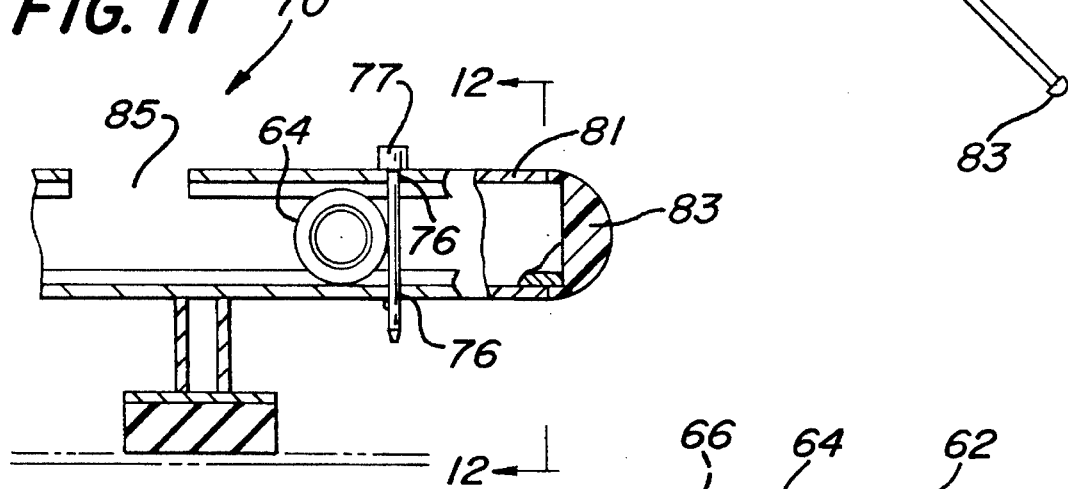
FIG. 11 is a fragmentary sectional view of track 70 on an increased scale.
Figure 12:
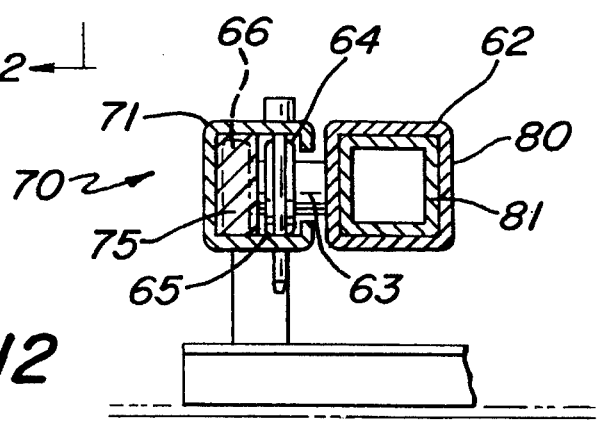
FIG. 12 is a section taken in the direction of arrows 12—12 of FIG. 11.

Another embodiment of the invention is illustrated in FIGS. 10–12. Only one side of apparatus 60 is illustrated in FIGS. 10–12 and described herein since the opposite side of apparatus 10 is identical to the side shown. Carrier 60 is comprised of a cover means 61, a telescoping frame 62, a plurality of first posts 63 having wheels 64, and a plurality of second posts 65 having wheels 66. FIG. 10 shows, in hatched lines, the carrier 60 in the carrier position and, in solid lines, the carrier 60 in the loading position.

First posts 63 and second posts 65 are attached to frame 62 as shown in FIGS. 10 and 12. First posts 63 are shorter than second posts 64 as shown in FIG. 12.

Track means, shown generally as 70, are comprised of a plurality of generally C-shaped tubular members 71 in which wheels 64 and 66 are enclosed. Each track means 70 has a first end 73 and a second end 74 as shown in FIG. 10. Each second end 74 is sealed. Each first end 73 is partially obstructed by a block 75 as shown in FIG. 12. First ends 73 also have bores 76 through which locking pins 77 are removably disposed and each track means has a second strut wheel removal port 85 as shown in FIG. 11.

Telescoping frame 62 is comprised of a plurality of exterior tubular members, illustrated by exterior tubular member 80 in coaxial arrangement with a plurality of interior tubular members, illustrated by interior tubular member 81 shown in FIGS. 10 and 12. Interior tubular members 81 are capped at one end by caps as shown by cap 83 in FIGS. 10 and 11.

With reference to FIGS. 10–12, carrier apparatus 60 is utilized by extending interior tubular members 81 from within exterior tubular members 80. Locking pins 77 are then removed from bores 76 and wheels 64 attached to first posts 63 are pulled past blocks 75 and out of track means 70. Telescoping frame 62 is then pulled away from vehicle 100 until wheels 66 impact blocks 75. Interior tubular members 81 then are lowered towards the ground until caps 83 contact the ground surface. Cover means 61 can then be disconnected from telescoping frame 62 to release cargo from frame 62 such as boat 200 shown in FIG. 10. Cover means 61 can be either elastic bands which removably attach to frame 62 and which attach cargo onto frame 62 or cover means 61 can be a hard shell mounted on frame 62 into which cargo is loaded and unloaded as the user desires. The telescoping frame of this embodiment of the invention provides the apparatus user a frame which can be positioned for loading and unloading at a level lower than a vehicle top and also provides the user with a means to use leverage to move heavy objects secured to the frame on and off of a vehicle top without excessive effort.

To return telescoping frame 62 from the loading position adjacent vehicle 100 to the carrier position atop vehicle 100, the user grasps interior tubular members 81 and raises the frame such that wheels 64 are in line with wheels 66 and track means 70. Pressure is then applied by the user on interior tubular members 81 until wheels 66 impact the second ends 73 of track means 70, and wheels 64 slide between blocks 75. Pins 77 are then reinserted into bores 76 and interior tubular members 81 are slid inside exterior tubular members 80 as shown in FIGS. 11 and 12. Frame 62 is then ready for transport in the carrier position shown by the hatched line illustrated in FIG. 10.

As an alternative to tipping frame 62 off of vehicle 100, frame 62 can be removed completely from track means 76 by removing locking pin 77 from bore 76, pulling wheels 64 past blocks 75, and then lifting wheels 66 attached to struts 63 through second strut removal port 85. Frame 62 can then be accessed for loading or unloading or stored until needed. To reattach frame 62 to track means 70, wheels 66 are inserted into port 85 and slid toward end 73 of track means 70, wheels 64 are inserted into track means 70 past blocks 75, and pin 77 is inserted into bore 76.

Carrier apparatus 60 thus provides a car top baggage container, which is simple to operate, can be removed from atop a vehicle as needed, has a tip-off design providing the invention user easy access to frame mounted cargo or cargo in a shell and provides a telescoping frame which allows the user to utilize leverage to position heavy loads on the frame or in the shell atop a vehicle.

Figure 13:
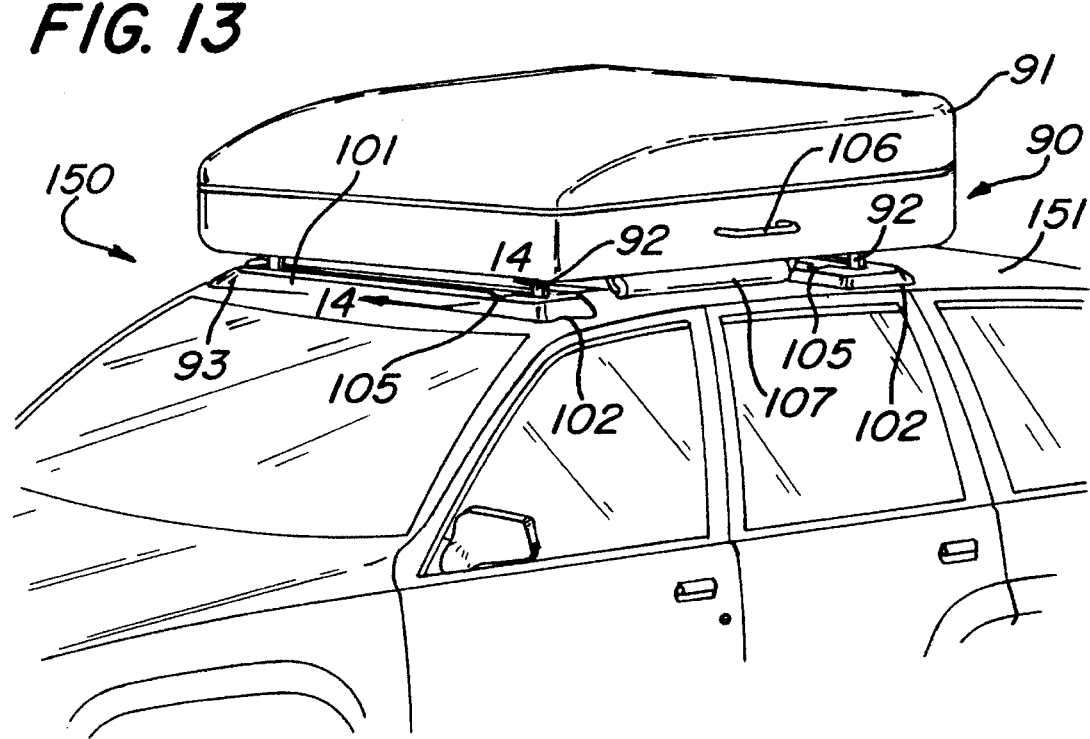
FIG. 13 is a perspective view of one embodiment of the carrier apparatus of the present invention secured atop a vehicle.
Figure 14:
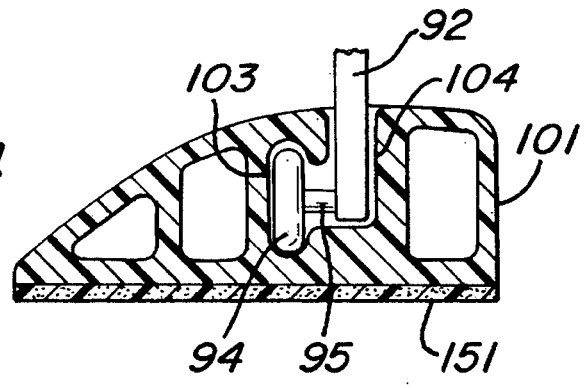
FIG. 14 is a section taken in the direction of arrows 14—14 of FIG. 13 on an increased scale.

Another embodiment of the invention is illustrated in FIGS. 13 and 14. FIG. 13 illustrates a car top carrier, shown generally as 90, mounted atop a vehicle shown generally as 150. Carrier 90 is comprised of a storage shell 91, a plurality of first struts 92, a plurality of second struts 93, and a plurality of tracks 101. Each strut has a bearing means which in this embodiment is an axle and wheel arrangement identical to the wheel 94 and axle 95 shown attached to first strut 92 in FIG. 14.

Each track 101 is fixed to a vehicle roof 151 and has a bearing means channel 103 and strut channel 104 as shown in FIG. 14. Each track 102 also has a bearing means removal port 105 as shown in FIG. 13.

Carrier apparatus 90 is utilized by applying pressure on shell 91 on the side of shell 91 adjacent both first struts 92 in the direction of second struts 93 to compress springs (not shown) which are located within channels 103 and 104 and to thereby align first struts 92 with wheel removal ports 105. Handle 106 is then utilized to lift shell 91 and to lift wheels 95 clear of channels 103 and 104 via ports 105. Shell 91 is then pulled away from vehicle top 151 while wheels 94 attached to second struts 93 slide past ports 105 within channels 103 until they come to rest adjacent end 102 of track 101. Since bearing means removal ports 105 are off-set from ends 102 of tracks 101, wheels 94 attached to second struts 93 remain within grooves 103. Bumper 107 is then positioned adjacent the passenger compartment of vehicle 150 to attain the loading position for apparatus 90.

Shell 91 is returned to the carrier position by lifting shell 91 by handle 106 and reinserting wheels 94 into ports 105 while compressing the springs within channels 103 and 104. Handle 106 is then released and the springs within channels 103 and 104 then apply pressure to second struts 93 forcing first struts wheels 94 away from ports 105 and thereby preventing inadvertent alignment of first struts 102 with bearing means removal ports 105 and subsequent accidental withdrawal of wheels 94 from channels 103. If the user desires to remove shell 91 completely from vehicle 150, the user simply removes both wheels 94 and 95 from ports 105 and lifts shell 91 clear of vehicle 150. Additionally, instead of a single shell 91, a plurality of containers smaller in size than a single shell 91 and having struts and wheel arrangements can be slid into ports 105 and carried atop vehicle 151 in a similar manner as described for shell 91.

Figure 15:
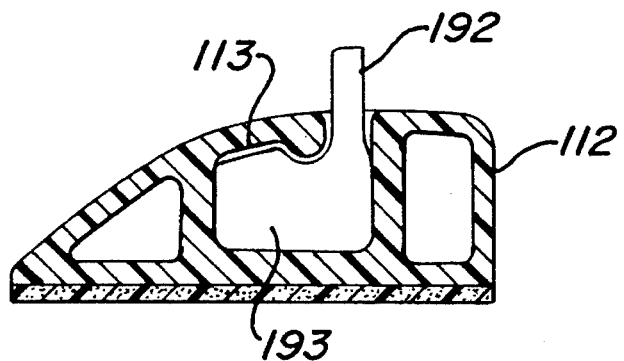
FIG. 15 is a section on an increased scale of an alternative embodiment of a strut.

FIG. 15 shows an alternative to the strut and wheel assemblies of FIGS. 13 and 14. In lieu of a wheel assembly, the bearing means attached to strut 192 is a club shaped member 193. Club ended strut 193 is slidably positioned within channel 113 of track means 112 and is removable from track means 112 via a port in the same manner as described above for strut 92 and wheel 94 in channels 103 and 104.

Thus, the invention described herein provides the user with a baggage carrier, mountable on a vehicle top which is adjustable from a carrier position atop a vehicle, to a loading position adjacent a vehicle, and to a position completely removed from a vehicle which provides the user easy access to the invention's storage shell. The invention is convenient to use and eliminates the necessity to utilize ladders or chairs or the need to climb on vehicle bumpers, tailgates, hoods, and the like to load and unload the carrier shell.

It will be appreciated that various changes in the details, arrangement of parts and steps, which have been described and illustrated in order to explain the nature of the invention, may be made by those skilled in the art and still remain within the principles and scope of the invention as expressed in the appended claims.

I claim:

1. A tip-off carrier apparatus attachable to the top of a vehicle, said apparatus comprising:

(a) a container;

(b) a plurality of first struts and a plurality of second struts wherein each of said struts is attached to said container, each of said struts having a bearing means attached thereto, each of said bearing means attached to said first struts being sized smaller than said bearing means attached to the second struts;

(c) a track means adapted to be attached to the top of said vehicle and adapted to receive each of said bearing means such that each of said bearing means contacts said track means, said track means having an open first end being sized to allow the passage of the bearing means of the first struts therethrough and to prevent the passage of the bearing means of the second struts therethrough to allow said shell to be moved from a carrier position on said vehicle top to said loading position adjacent to said vehicle and offset from said vehicle top, said track means further having a strut removal part adjacent said first end of said track means to allow removability of said bearing means of said second struts from said track means when said first struts are removed through said first end.

2. The apparatus of claim 1 wherein said bearing means is a club-shaped member.

3. A tip-off carrier apparatus attachable to the top of a vehicle, said apparatus comprising:

(a) a storage shell container having a lid portion separably attached to a base portion, said base portion having a bumper means for supporting said shell against said top of said vehicle when said shell is in a loading position;

(b) a plurality of first struts and a plurality of second struts wherein each of said struts is attached to said storage shell, each of said struts having a wheel assembly attached thereto, each of said wheel assemblies comprising a wheel attached to an axle wherein said axle is attached to a respective one of said struts, said axles attached to said first struts being shorter than said axles attached to the second struts;

(c) a track means adapted to be attached to the top of said vehicle, said wheel assemblies adapted to make rolling contact with said track means, said track means having an open first end being sized to allow the passage of the wheel assemblies of the first struts therethrough and to prevent the passage of the wheel assemblies of the second struts therethrough to allow said shell to be moved from a carrier position on said vehicle top to said loading position adjacent to said vehicle and offset from said vehicle top, said track means further having a strut removal part adjacent to said first end of said track means to allow removability of said wheel assemblies of said second struts from said track means when said first struts are removed through said first end.

4. The apparatus of claim 3 wherein said open first end is partially obstructed by blocking means and is bisectable by a removable retaining pin, said blocking means allowing passage of said wheel assemblies attached to said plurality of first struts through said first end and prohibiting passage of said wheel assemblies attached to said plurality of second struts through said first end when said retaining pin is removed from said first end, to attain said loading position, and said wheel assemblies attached to said plurality of first struts prohibited from exiting said first end when said retaining pin bisects said first end and when said shell is in said carrier position.

* * * * *